US012685410B2

(12) United States Patent
Warren, V et al.

(10) Patent No.: US 12,685,410 B2
(45) Date of Patent: Jul. 21, 2026

(54) KITCHEN IMPLEMENT ORGANIZER

(71) Applicant: Takos LLC, Madison, MS (US)

(72) Inventors: Hugh Anslum Warren, V, Madison, MS (US); Caroline P. Warren, Madison, MS (US)

(*) Notice: Subject to any disclaimer, the term of this patent is extended or adjusted under 35 U.S.C. 154(b) by 0 days.

(21) Appl. No.: 18/356,714

(22) Filed: Jul. 21, 2023

(65) Prior Publication Data

US 2023/0380636 A1 Nov. 30, 2023

Related U.S. Application Data

(60) Provisional application No. 63/365,210, filed on May 24, 2022.

(51) Int. Cl.
*A47J 47/16* (2006.01)
*A47F 7/00* (2006.01)
*A47G 21/14* (2006.01)

(52) U.S. Cl.
CPC ............. *A47J 47/16* (2013.01); *A47F 7/0028* (2013.01); *A47G 21/14* (2013.01)

(58) Field of Classification Search
CPC ......... A47J 47/16; A47G 21/14; A47F 7/0028
See application file for complete search history.

(56) References Cited

U.S. PATENT DOCUMENTS 1,092,156 A * 4/1914 Mathis ................... B65D 25/14 206/207
1,296,158 A * 3/1919 Bonham .............. B65D 5/5213 206/214
2,357,646 A * 9/1944 Gilbert ................... A47G 21/14 30/298.4
2,682,950 A * 7/1954 Mercer .................. A47B 77/14 D7/637
3,677,400 A * 7/1972 Spier ...................... A47G 21/14 248/37.3
3,745,702 A * 7/1973 Ogawa ...................... A47G 7/07 D11/147
4,305,511 A * 12/1981 Denholtz ............... A47G 21/14 248/37.3
4,423,552 A * 1/1984 Bourgein ............... A47G 21/14 248/37.3
4,534,474 A * 8/1985 Ng ......................... A47G 21/14 248/37.3
4,537,315 A * 8/1985 Griffin ................... A47G 21/14 248/37.3
4,561,548 A * 12/1985 Call ....................... A47G 21/14 248/37.3
4,601,400 A * 7/1986 Buchanan ............. A47G 21/14 312/204

(Continued)

FOREIGN PATENT DOCUMENTS

CH 673758 A5 * 4/1990
GB 208924 A * 1/1924

(Continued)

*Primary Examiner* — Stanton L Krycinski

(57) ABSTRACT

A kitchen implement organizer comprising an implement guide member, a platform, a base, and a housing, wherein the implement guide member and the platform are configured to maximize the accessibility of each kitchen implement by vertically and horizontally offsetting the implements from one another.

16 Claims, 15 Drawing Sheets

(56) References Cited

U.S. PATENT DOCUMENTS

| | | | | | |
|---|---|---|---|---|---|
| 4,799,744 | A * | 1/1989 | Toy | A47J 47/16 | 211/184 |
| 5,361,915 | A * | 11/1994 | Cohen | A47G 21/14 | 248/37.3 |
| 5,775,518 | A * | 7/1998 | Connor | A47G 21/14 | 248/37.3 |
| 5,850,784 | A * | 12/1998 | Conner | A47J 47/005 | 248/37.3 |
| 6,079,108 | A * | 6/2000 | Lin | A47G 21/14 | 248/37.3 |
| 6,371,312 | B1 * | 4/2002 | Tsuchida | A47G 21/14 | 248/37.3 |
| 6,394,627 | B1 * | 5/2002 | Lo | A47G 21/14 | 362/127 |
| 6,659,406 | B2 * | 12/2003 | Tsuchida | A47G 21/14 | 248/37.3 |
| 6,854,186 | B2 * | 2/2005 | Basden | A47G 21/14 | 248/37.3 |
| 6,877,231 | B2 * | 4/2005 | Rosenberg | A47G 21/14 | 248/37.3 |
| 6,920,987 | B2 * | 7/2005 | Siegel | A47G 21/14 | 248/37.3 |
| 6,929,116 | B2 * | 8/2005 | Chao | A45C 11/04 | 206/5 |
| 7,267,238 | B2 * | 9/2007 | Yang | A47G 21/14 | 220/572 |
| 9,693,644 | B1 * | 7/2017 | Liu | B24D 15/081 | |
| 9,770,126 | B2 * | 9/2017 | Ludeman | A47G 21/14 | |
| 9,878,442 | B2 * | 1/2018 | Simakis | B43K 23/001 | |
| 10,383,468 | B2 * | 8/2019 | Kerulis | A47G 21/14 | |
| 10,413,104 | B1 * | 9/2019 | Loheit | A61B 50/20 | |
| D870,808 | S * | 12/2019 | Xu | D19/85 | |
| 11,350,771 | B2 * | 6/2022 | Washington | A47F 5/0018 | |
| 11,412,873 | B2 * | 8/2022 | Kelly | E05B 73/00 | |
| 2003/0066971 | A1 * | 4/2003 | Yen | A47J 47/16 | 250/455.11 |
| 2005/0205506 | A1 * | 9/2005 | Siegel | A47G 21/14 | 211/70.7 |
| 2007/0144987 | A1 * | 6/2007 | Linzing | A47G 21/14 | 211/70.7 |
| 2011/0283547 | A1 * | 11/2011 | Wang | A47G 21/14 | 30/298.4 |
| 2012/0266468 | A1 * | 10/2012 | Murphy | B24D 15/084 | 30/298.4 |
| 2015/0008155 | A1 * | 1/2015 | Amos | B65D 81/113 | 206/763 |
| 2015/0298296 | A1 * | 10/2015 | Cook | B24D 15/081 | 451/552 |
| 2018/0000268 | A1 * | 1/2018 | Zhijian | G07C 9/00563 | |
| 2018/0035833 | A1 * | 2/2018 | Viskup | A47G 21/14 | |
| 2018/0055259 | A1 * | 3/2018 | Hagger | B26B 29/025 | |
| 2018/0249886 | A1 * | 9/2018 | Thompson | B32B 27/32 | |

FOREIGN PATENT DOCUMENTS

| | | | |
|---|---|---|---|
| GB | 492775 | A * | 9/1938 |
| GB | 937870 | A * | 9/1963 |
| KR | 100984397 | B1 * | 9/2010 |

* cited by examiner

KITCHEN IMPLEMENT ORGANIZER

CROSS-REFERENCE TO RELATED APPLICATION

This application claims priority to U.S. Provisional Patent Application No. 63/365,210, filed on May 24, 2022, which is hereby incorporated by reference in its entirety.

FIELD

One aspect of the present disclosure relates to an implement organizer, and more particularly to a kitchen implement organizer that has an implement guide member and a platform.

BACKGROUND

Kitchen implements, such as spoons, tongs, turners, whisks, and the like are often stored in vases or similar tall vessels on a counter-top. Often, these storage vessels are ill-fitted to store a wide variety of kitchen implements and detract from the organization of the kitchen. Other kitchen implement organizers that provide partitions might not adequately isolate the implements from one another. As a result, a single implement might not be easily accessible or might not be visible to a user.

SUMMARY

The following presents a simplified summary of the disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One aspect of the present disclosure provides a kitchen implement organizer that helps maximize the accessibility of each kitchen implement and minimize the counterspace required to store the implements by horizontally and vertically offsetting the implements from one another. The implement organizer may maintain the implements in a vertical orientation and may help minimize rotational movement of the implements. An example implement organizer may include a housing, an implement guide member with a plurality of holes for receiving implement handles, a platform with a plurality of indentations for receiving and housing terminal ends of implement handles, a base, and a weighted portion.

These as well as other novel advantages, details, examples, features and objects of the present disclosure will be apparent to those skilled in the art from following the detailed description, the attached claims and accompanying drawings, listed herein, which are useful in explaining the concepts discussed herein.

BRIEF DESCRIPTION OF THE DRAWINGS

A more complete understanding of the present disclosure and the advantages thereof may be acquired by referring to the following description in consideration of the accompanying drawings. Some features are shown by way of example, and not by limitation, in the accompanying drawings. In the drawings, like numerals reference similar elements.

DETAILED DESCRIPTION

In the following description of the various examples, reference is made to the accompanying drawings, which form a part hereof, and in which is shown by way of illustration various examples in which aspects may be practiced. References to "embodiment," "example," and the like indicate that the embodiment(s) or example(s) of the disclosure so described may include particular features, structures, or characteristics, but not every embodiment or example necessarily includes the particular features, structures, or characteristics. Further, it is contemplated that certain embodiments or examples may have some, all, or none of the features described for other examples. And it is to be understood that other embodiments and examples may be utilized and structural and functional modifications may be made without departing from the scope of the present disclosure.

Unless otherwise specified, the use of the serial adjectives, such as, "first," "second," "third," and the like that are used to describe components, are used only to indicate different components, which can be similar components. But the use of such serial adjectives is not intended to imply that the components must be provided in given order, either temporally, spatially, in ranking, or in any other way.

Also, while the terms "front," "back," "side," and the like may be used in this specification to describe various example features and elements, these terms are used herein as a matter of convenience, for example, based on the example orientations shown in the figures and/or the orientations in typical use. Nothing in this specification should be construed as requiring a specific three dimensional or spatial orientation of structures in order to fall within the scope of the claims.

Figure 1A:
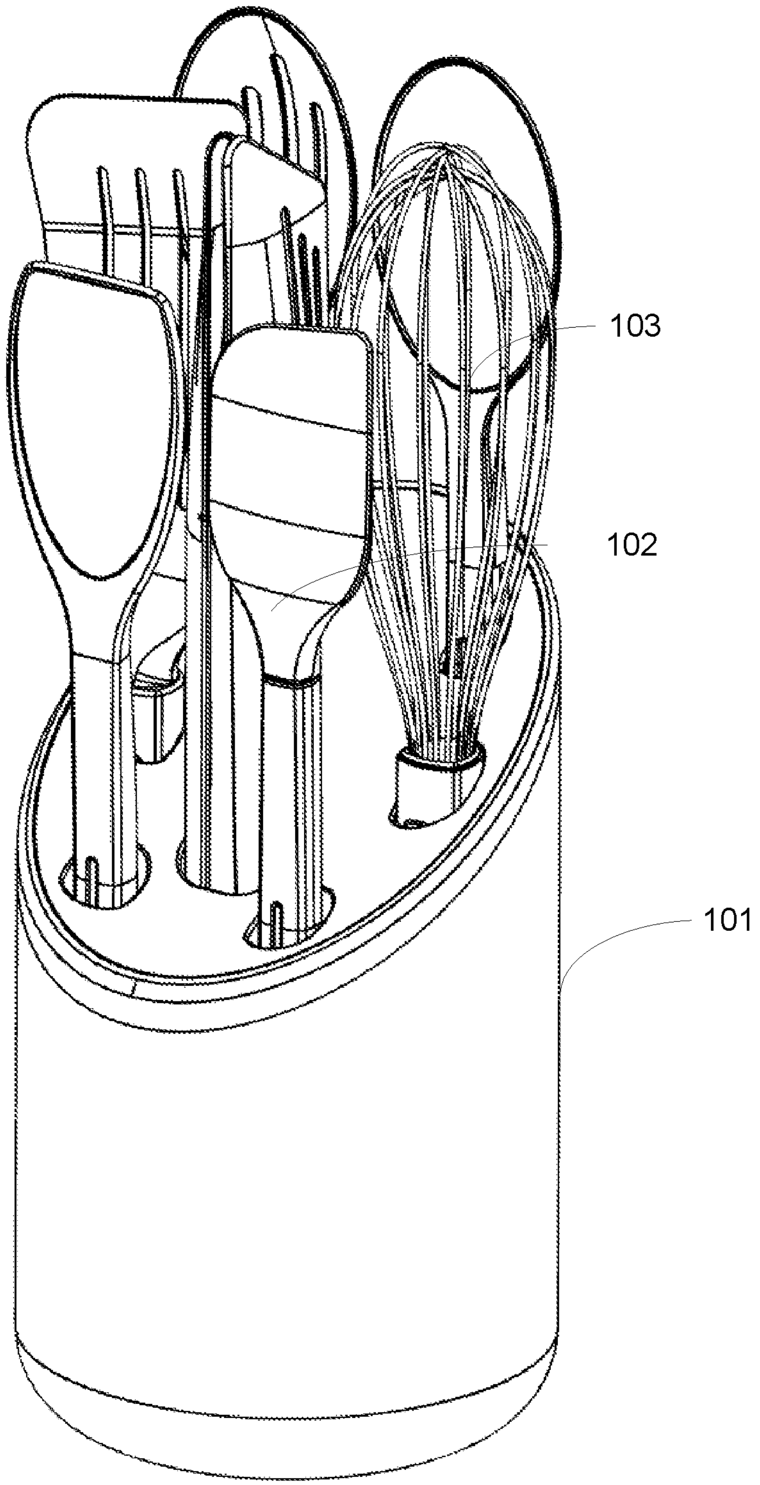
FIG. 1A is a perspective view of an example kitchen implement organizer and example kitchen implements that may be used in combination.

FIG. 1A illustrates an example a kitchen implement organizer 101 and example kitchen implements 102 and 103 that may be used in combination with the implement organizer 101. As will be discussed in greater detail with respect to the remaining figures, the implement organizer 101 may be configured to receive and house, in an organized manner, a plurality of kitchen implements, including implements 102 and 103. Implement 102 may be, for example, a silicone spatula. Implement 103 may be, for example, a whisk. Implements 102 and/or 103 may be any one of a turner, tongs, a blunt-nose spoon, a slotted spoon, a mixing spoon, or other common kitchen implements.

Implement organizer 101 may be configured to help maximize the accessibility of each kitchen implement by maintaining each implement in an upright manner and preventing any given implement from contacting another while being stored. Implement organizer 101 may be further configured such that the heads of each implement are vertically and horizontally spaced in such a way that when a user retrieves a given implement, he can easily grasp the head of the desired implement without disturbing the other implements. Implement organizer 101 may be displayed on a counter-top or it may be adapted to mount to a utensil pull-out-style cabinet.

Figure 1B:
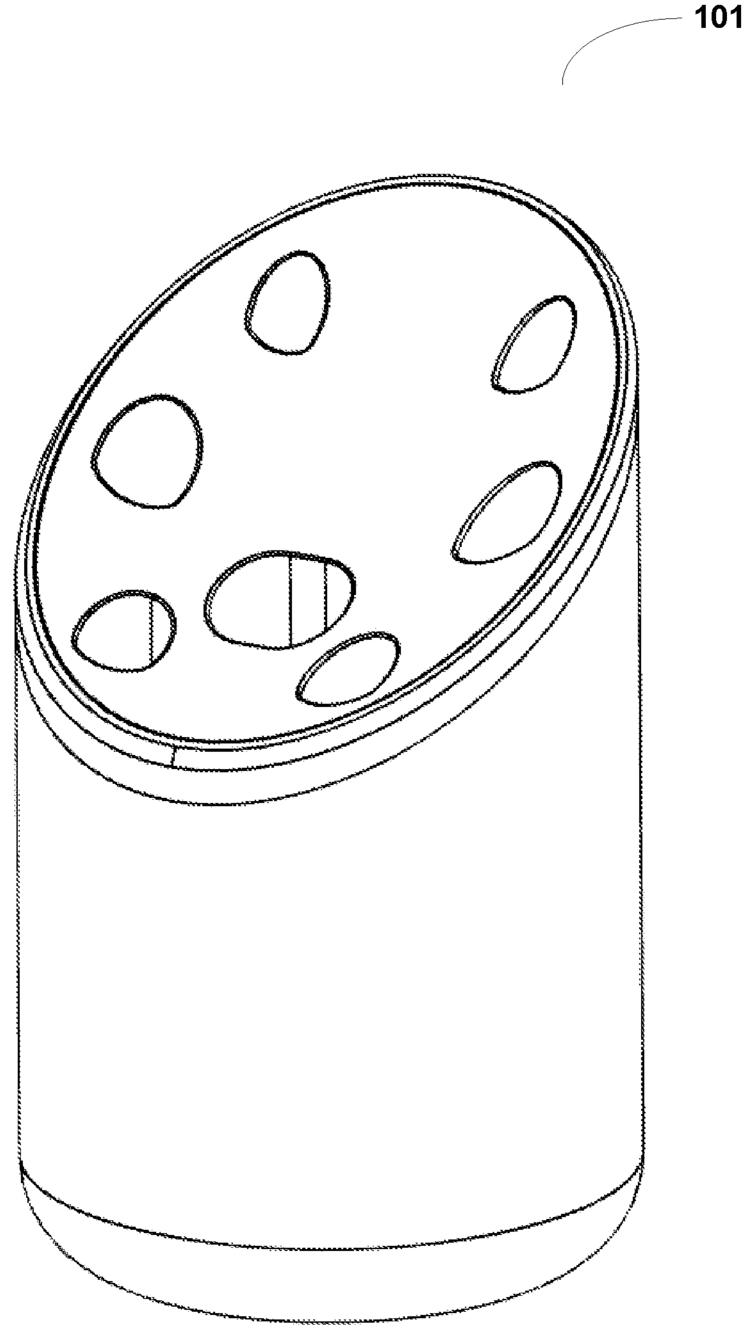
FIG. 1B is a perspective view of the example kitchen implement organizer of FIG. 1A.

FIG. 1B illustrates the kitchen implement organizer 101 with the example kitchen implements, including implements 102 and 103, removed.

Figure 2A:
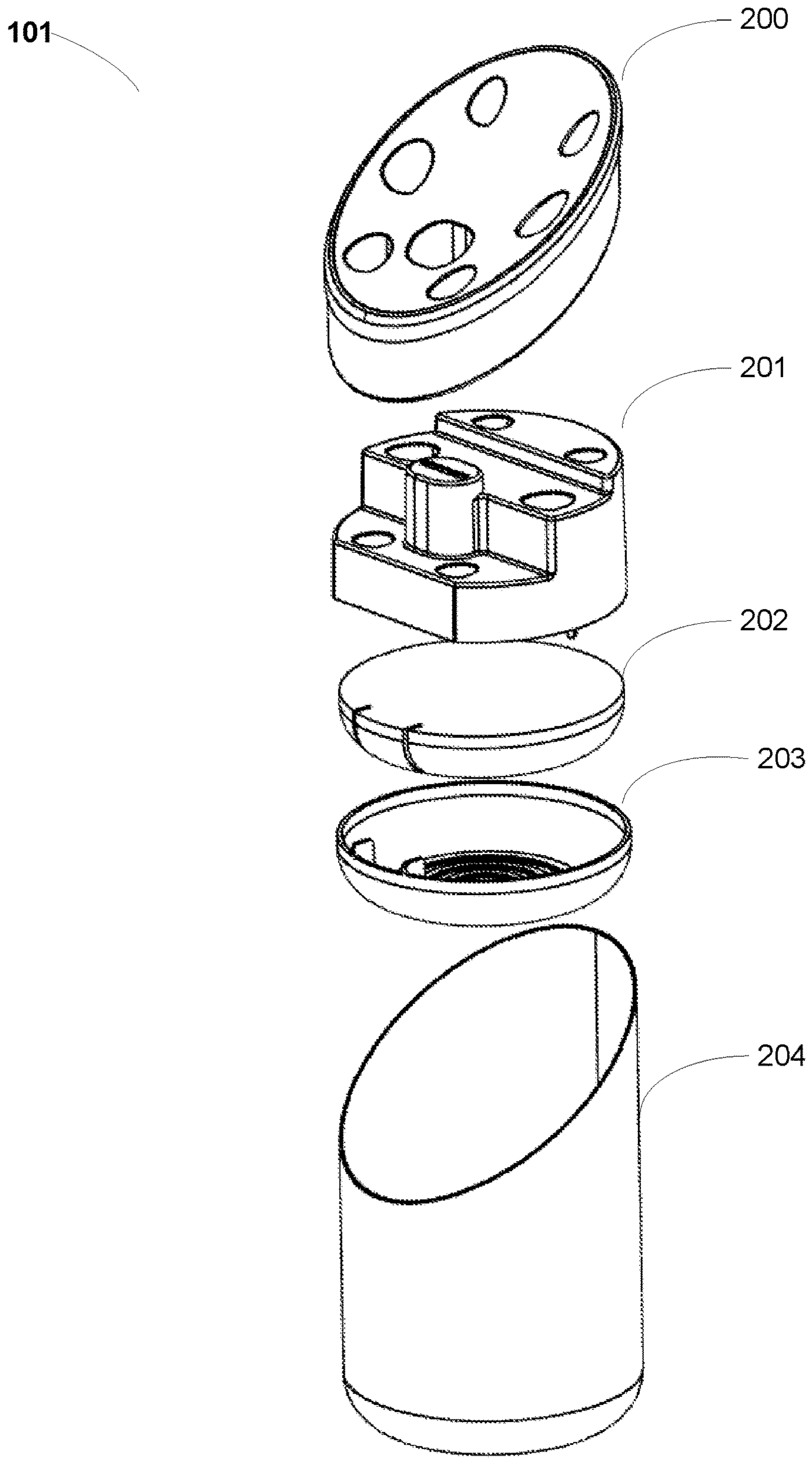
FIG. 2A is an exploded perspective view of the example kitchen implement organizer of FIG. 1B.
Figure 2B:
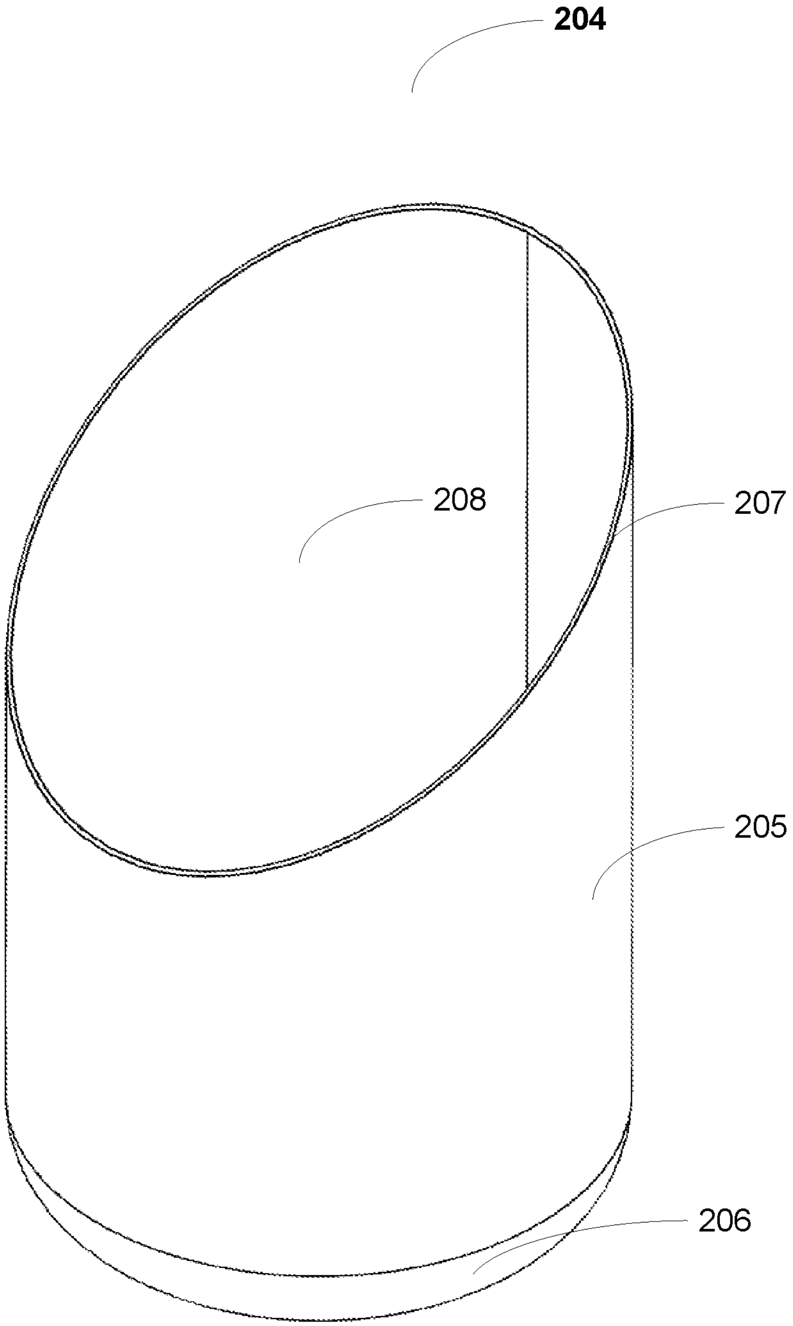
FIG. 2B is a perspective view of an example housing of the example kitchen implement organizer of FIG. 1B.

FIG. 2A illustrates an exploded view of the example kitchen implement organizer 101. The implement organizer 101 may include an implement guide member 200 (further discussed with respect to FIGS. 3A-3C), a platform 201 (FIGS. 4A-4B), a weighted portion 202 (FIG. 6), a base 203 (FIGS. 6 and 7), and a housing 204 (FIG. 2B). Implement guide member 200 may be coupled to and suspended by a top edge 207 (FIG. 2B) of housing 204. Platform 201, weighted portion 202, and base 203 may be coupled to one another and seated in an internal space 208 (FIG. 2B) of housing 204. Base 203 may be coupled to housing 204.

FIG. 2B illustrates an example housing 204. Housing 204 may be configured with a number of geometries, including cylindrical (as shown in FIG. 2B) or rectangular. Similarly, elements 200-203 may have overall geometries that correspond to the geometry of housing 204. Housing 204 may include a sidewall 205, a base 206, and a top edge 207. In one example, the top edge 207 may be formed at an angle of 35 degrees relative to the ground plane. In another example, the top edge 207 may be formed at an angle of less than 35 degrees or more than 35 degrees relative to the ground plane, including at an angle of zero degrees relative to the ground plane.

Housing 204 may define an internal space 208. In this example, platform 201, weighted portion 202, and base 203 may be coupled to one another and may occupy the internal space 208. Base 203 may be coupled to an interior bottom surface of the base 206 (not shown) with an adhesive, for example a food-safe adhesive, or may be coupled with rivets or other similar fasteners. Base 206 may include an opening through which an overmold 800 may contact the surface upon which implement organizer 101 rests (further discussed with respect to FIG. 6). Additionally, in an example, implement guide member 200 may be suspended by top edge 207 (further discussed with respect to FIG. 3A).

In one example, the base 206 may be integrally coupled to the sidewall 205. In another example, base 206 may be rotatably coupled to sidewall 205 to enable the implement organizer 101 to be utilized in a carousel-style fashion via a ball bearing mechanism (not shown). The base 206 may include a channel that runs along the perimeter of base 206 at the seam at which base 206 meets sidewall 205 (not shown). The channel may include a plurality of ball bearings that may contact a bottom surface of sidewall 205 and allow housing 204 to freely rotate independently of base 206. Base 206 may be coupled to housing 204 with a pin. Housing 204 may be constructed from a number of resilient materials, including any number of wood species, sheet metal of various gauge thicknesses, other metals such as zinc, iron, or aluminum, hard plastics, sheet metal with silicone overmold, and the like.

In an alternative example, implement organizer 101 might not include a housing 204. Rather, at least one support member (not shown) may couple the implement guide member 200 to the platform 201 while supporting the implement guide member 200 above the platform 201. In this example, portions of the example kitchen implements (such as those shown in FIG. 1A) may be visible as opposed to being concealed by the sidewall 205 of housing 204. In yet another example, the implement guide member 200 and the platform 201 may be integral to one another and constitute a single component. In yet another example, the kitchen implement organizer 101 might not include an implement guide member 200, a weighted portion 202, a base 203, or a housing 204. Rather, the implement organizer 101 may only include the platform 201.

Figure 3A:
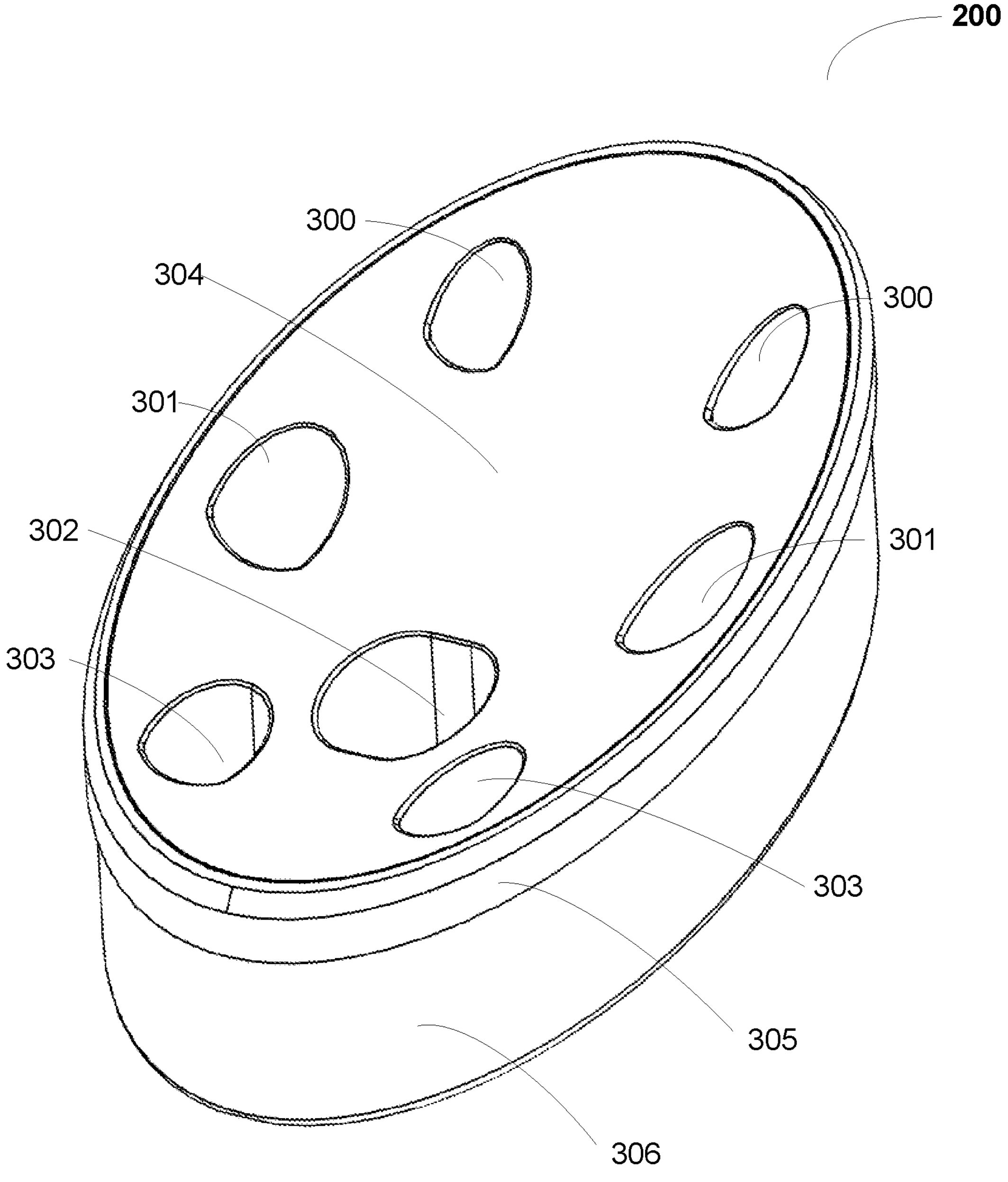
FIG. 3A is a perspective view of an example implement guide member of the example kitchen implement organizer of FIG. 1B.
Figure 3B:
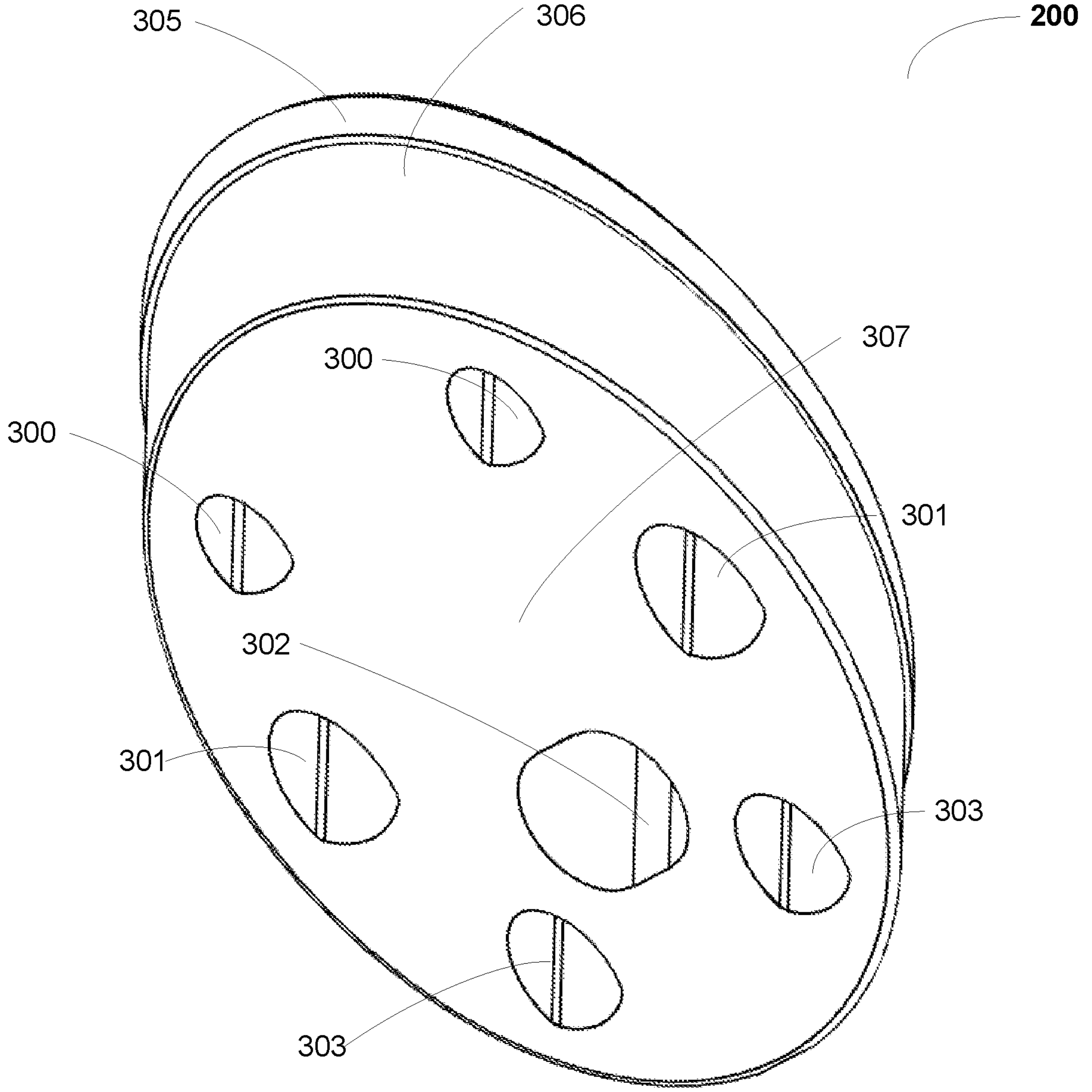
FIG. 3B is a perspective view of the bottom of an example implement guide member of FIG. 3A.
Figure 3C:
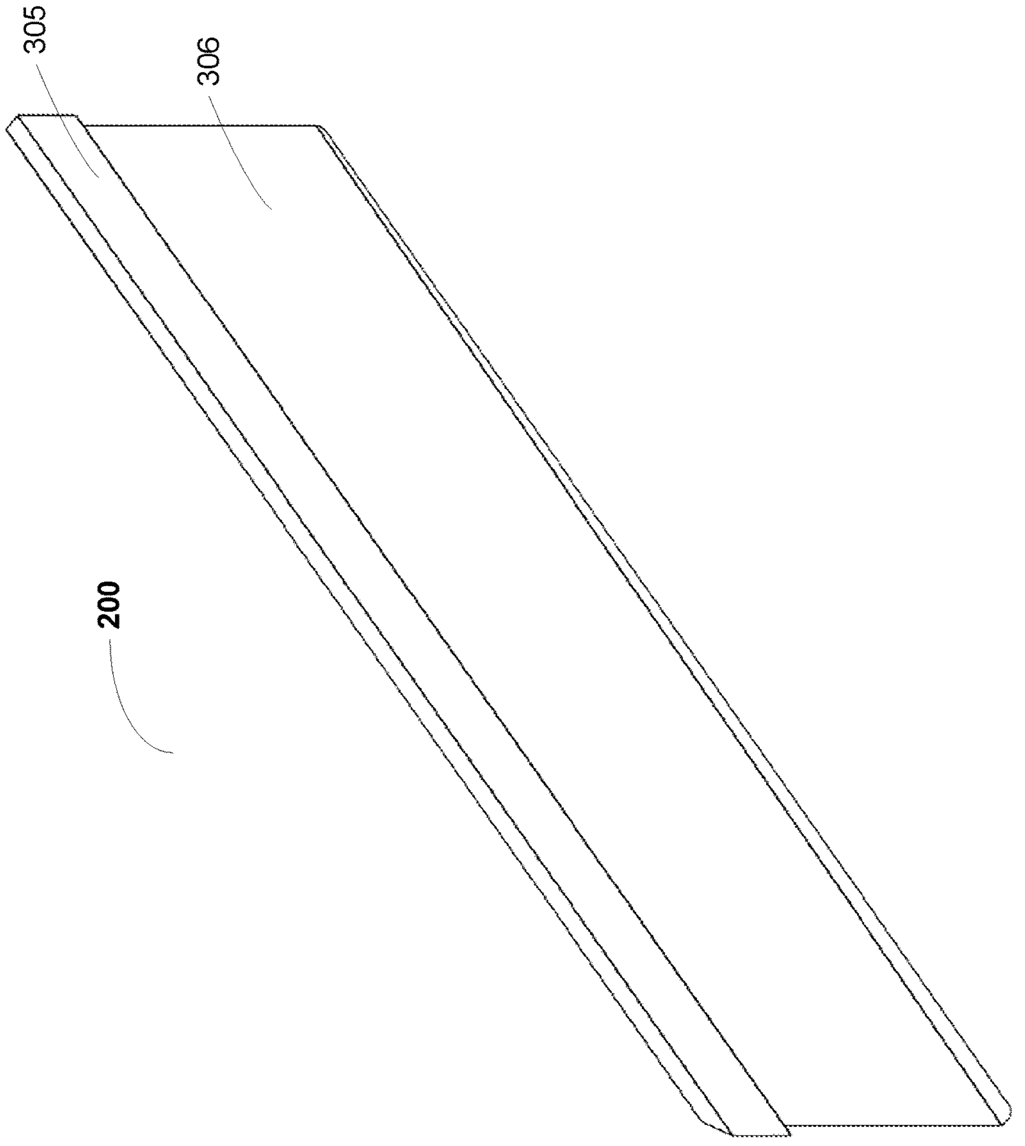
FIG. 3C is a side view of the example implement guide member of FIGS. 3A and 3B.

FIGS. 3A-3C illustrate an example implement guide member 200, which may help maintain kitchen implements in an upright, organized manner while they are being stored in the implement organizer 101. The implement guide member 200 may be injection molded acrylic, plastic, silicon, etc., or milled or formed with a Computer Numerical Control (CNC) machine from any number of species of wood or types of metal. Implement guide member 200 may include a plurality of holes 300-303. Holes 300-303 may be formed in the top surface 304 of the implement guide member 200 and may extend through the bottom surface 307 (FIG. 3B), thus creating a plurality of channels passing through the implement guide member 200. In one example, holes 300-303 comprise seven holes. In other examples, holes 300-303 may comprise fewer or more than seven holes. Holes 300-303 may be arranged in a number of ways throughout implement guide 200. In one example, holes 300-303 may be arranged such that a given set of kitchen implements are spaced in such a way that no kitchen implement contacts another while being stored in implement organizer 101.

Holes 300-303 may be formed with substantially equivalent geometries (i.e., equivalent shapes, dimensions, etc.). In another example, holes 300-303 may be formed with unique geometries that correspond to the shape of a given kitchen implement handle. The geometry (i.e., the perimeter of each hole that defines the shape of the hole) of holes 300 and 303 may correspond to the perimetric profile (i.e., the outer profile, or outer surface, of each implement handle that defines the shape of the implement handle) of several types of kitchen implement handles (further discussed with respect to FIG. 5C), for example whisk and spatula handles. For example, the handle of whisk 103 may have a larger or smaller diameter than that of the handle 501 of spatula 102. The handle 501 of spatula 102 may have a larger or smaller diameter than that of the handle of whisk 103. The perimetric profile of handle 501 of spatula 102 may be substantially equivalent to that of the handle of whisk 103, or, in another example, may be different. Similarly, the geometry of holes 301 may correspond to a perimetric profile of other types of kitchen implement handles, for example spoon and turner handles. Additionally, the geometry of hole 302 may correspond to yet another type of kitchen implement handle, for example, tong handles. In each of these examples, and as a result of the corresponding geometries among the holes and the implement handles, the holes 300-303 may help reduce rotational movement of the kitchen implements when they are seated in the implement organizer 101 such that the desired faces of the kitchen implements remain substantially forward-facing (i.e., toward the front of the implement organizer). FIG. 5E illustrates an example arrangement of kitchen implements whereby handle 501 of kitchen implement 102 is substantially contiguous with holes 303. In yet another example, holes 300-303 may be formed with "generic" geometries, i.e., geometries that might not correspond to a given shape of a kitchen implement handle.

Referring again to FIGS. 3A-3C, implement guide member 200 may include a shoulder 305 and a neck 306. The top edge 207 of housing 204 (FIG. 2B) may suspend the shoulder 305 when the implement guide member 200 is seated on the housing 204. When implement guide member 200 is seated in housing 204, the outer diameter of the neck 306 may be contiguous with an internal surface of the housing 204 to help ensure that the implement guide 200 is seated correctly on housing 204. Neck 306 may be coupled to housing 204 with an adhesive, for example a food-safe adhesive, or it may be coupled to the housing 204 with a rivet or other similar fastener, including a threaded screw (s).

The implement guide member 200 may be formed an angle that is substantially equivalent to that of the top edge 207 of housing 204. For example, the top surface 304 and the bottom surface 307 of implement guide member 200 may be formed at an angle of 35 degrees relative to the ground plane. In another example, the top edge 207 of housing 204, the top surface 304, and/or the bottom surface 307 may be formed at an angle of less than 35 degrees or more than 35 degrees relative to the ground plane, including at an angle of zero degrees relative to the ground plane. In yet another example, top surface 304 may be formed at an angle and also include a concavity that increases in depth toward the center of implement guide 200.

Figure 4A:
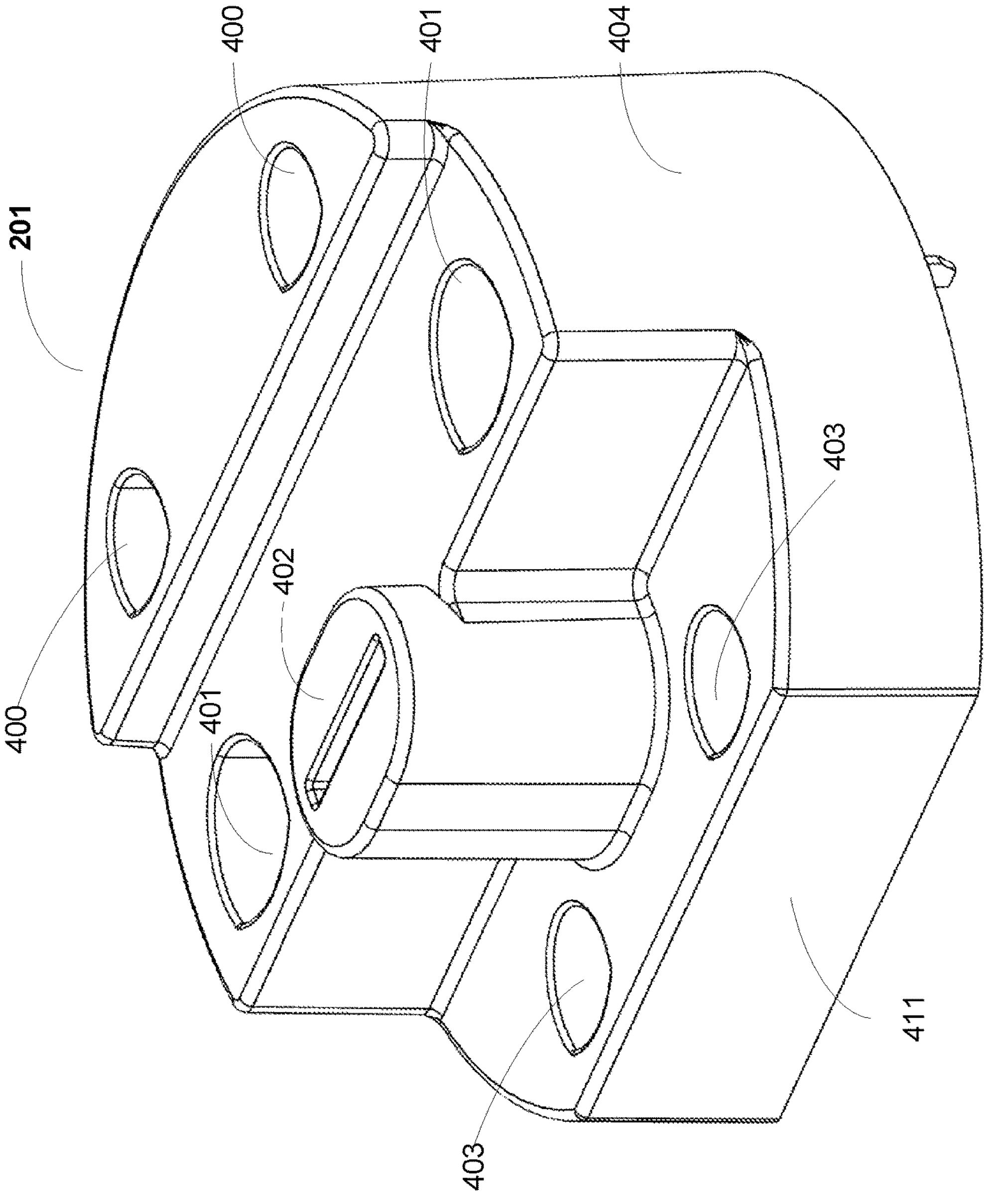
FIG. 4A is a perspective view of an example platform of the example kitchen implement organizer of FIG. 1B.

FIG. 4A illustrates an example platform 201 which may help maintain kitchen implements in an upright, organized manner while they are being stored in the implement organizer 101 by vertically and horizontally offsetting the implements from one another. The platform 201 may be injection molded acrylic, plastic, silicon, or other resilient material. Platform 201 may include, for example, indentations 400-403. Indentations 400-403 may be formed in surfaces 407, 408, and 409, respectively, of the platform 200 and may define cavities 400*a*, 401*a*, 402*a*, and 403*a* (FIG. 4B), respectively. In one example, indentations 400-403 comprise seven indentations and seven respective cavities 400*a*-403*a*. In other examples, indentations 400-403 may comprise fewer or more than seven indentations and respective cavities 400*a*-403*a*. Indentations 400-403 may be arranged in a number of ways across platform 201. In one example, indentations 400-403 may be arranged such that a given set of kitchen implements are spaced in such a way that no kitchen implement contacts another while being stored in implement organizer 101. Indentations 400-403 may be vertically aligned with holes 300-303 of the implement guide member 200, respectively. For example, as a result of the vertical alignment of hole 303 with indentation 403, an implement seated in indentation 403 may be maintained in a vertical orientation at about ninety degrees relative to the ground plane.

Indentations 400-403 may be formed with substantially equivalent geometries (i.e., equivalent shapes, dimensions, including perimeter, etc.). In another example, indentations 400-403 may be formed with unique geometries that correspond to the shape of a perimetric profile, or outer surface, of a given kitchen implement handle. The geometry (i.e., the perimeter of each indentation that defines the shape of the indentation) of indentations 400 and 403 may correspond to the perimetric profile (i.e., the outer profile, or outer surface, of each implement handle that defines the shape of the implement handle) of several types of kitchen implement handles (further discussed with respect to FIG. 5C), for example spoon and spatula handles. Similarly, the geometry of indentations 401 may correspond to a perimetric profile of other types of kitchen implement handles, for example whisk and turner handles. Additionally, the geometry of indentation 402 may correspond to yet another type of kitchen implement member, for example, a locking mechanism for tongs. In each of these examples, and as a result of the corresponding geometries among the indentations and the implement handles, the indentations 400-403 may help reduce rotational movement of the kitchen implements when they are seated in the implement organizer 101 such that the desired faces of the kitchen implements remain substantially forward-facing (i.e., toward the front of implement organizer 101). In yet another example, indentations 400-403 may be formed with "generic" geometries, i.e., geometries that might not correspond to a given shape of a kitchen implement handle.

Figure 4B:
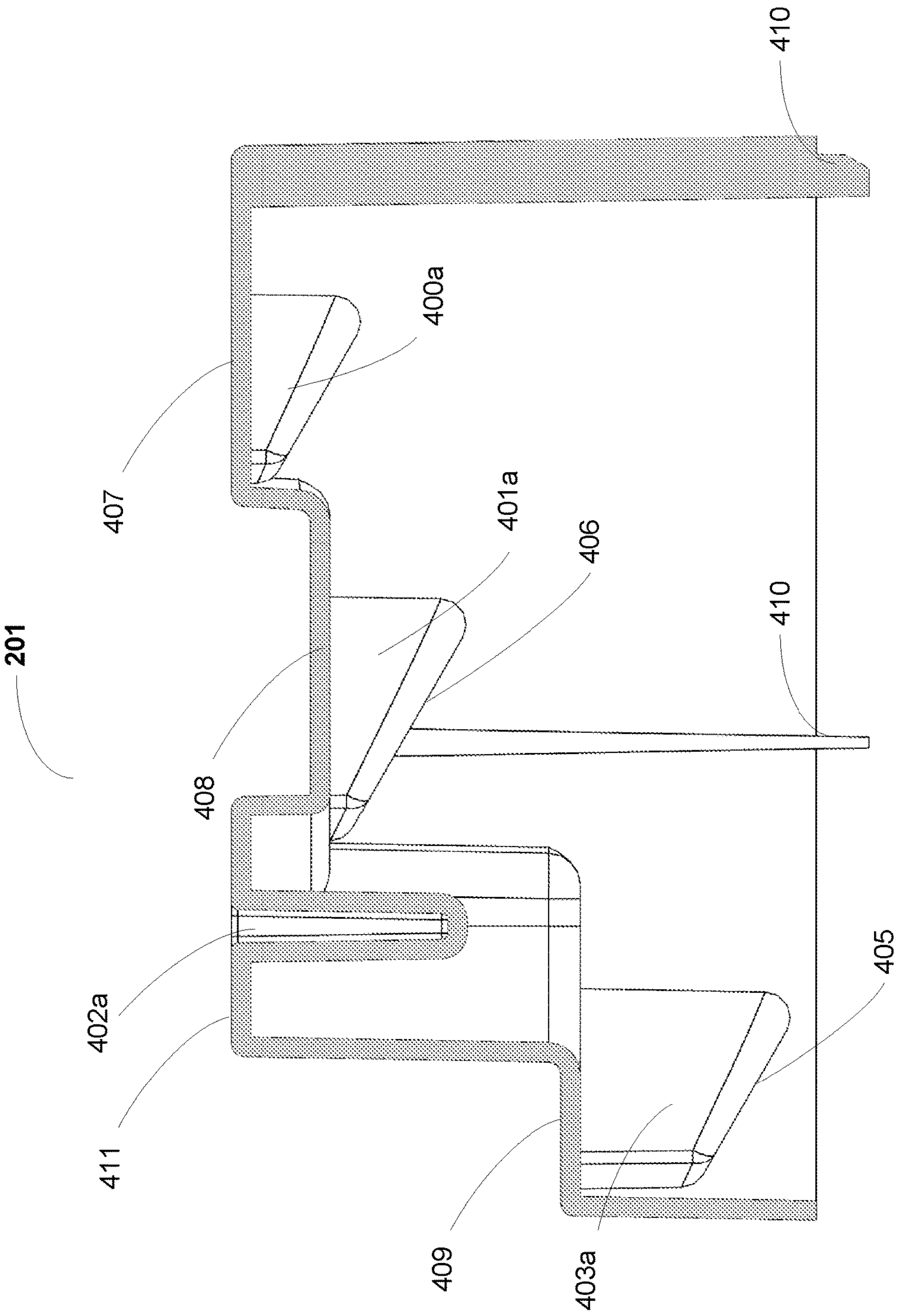
FIG. 4B is a longitudinal cross-sectional view of a portion of the example platform of FIG. 4A.

The platform 201 may be configured to seat the terminal ends of various kitchen implement handles (terminal ends further discussed with respect to FIGS. 5A-5D). FIG. 4B illustrates a longitudinal cross-sectional view of the example platform 201. Cavities 400*a*-403*a* may have substantially similar perimeters to indentations 400-403, respectively. Cavities 400*a*-403*a* may each also define a space that includes a bottom surface formed at an angle that is substantially equivalent to that of a terminal end of a given kitchen implement.

Figures 5A, 5B:
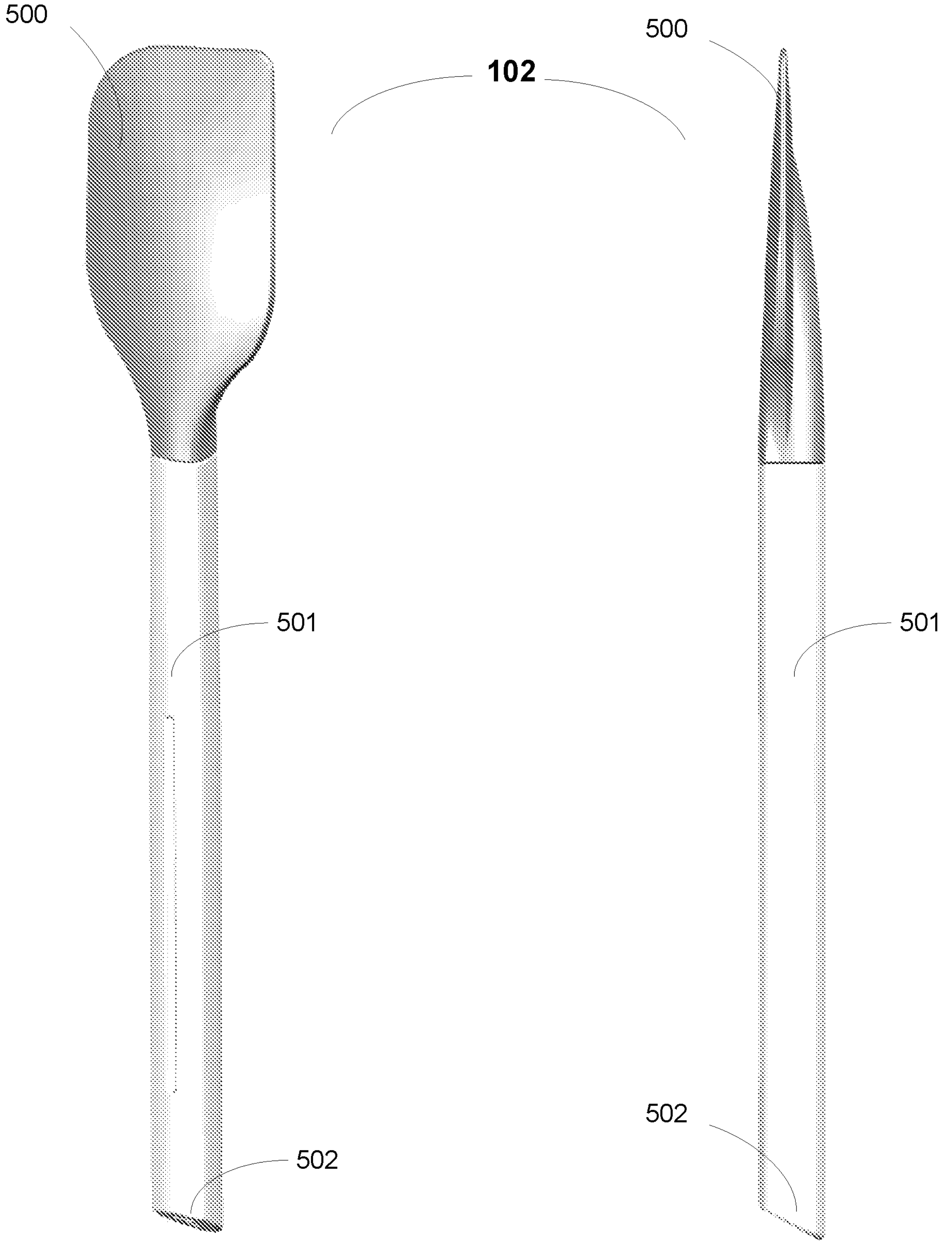
FIG. 5A is a perspective view of an example kitchen implement which may be used in combination with the example kitchen implement organizer of FIG. 1B.
FIG. 5B is a side view of the example kitchen implement of FIG. 5A.
Figure 5C:
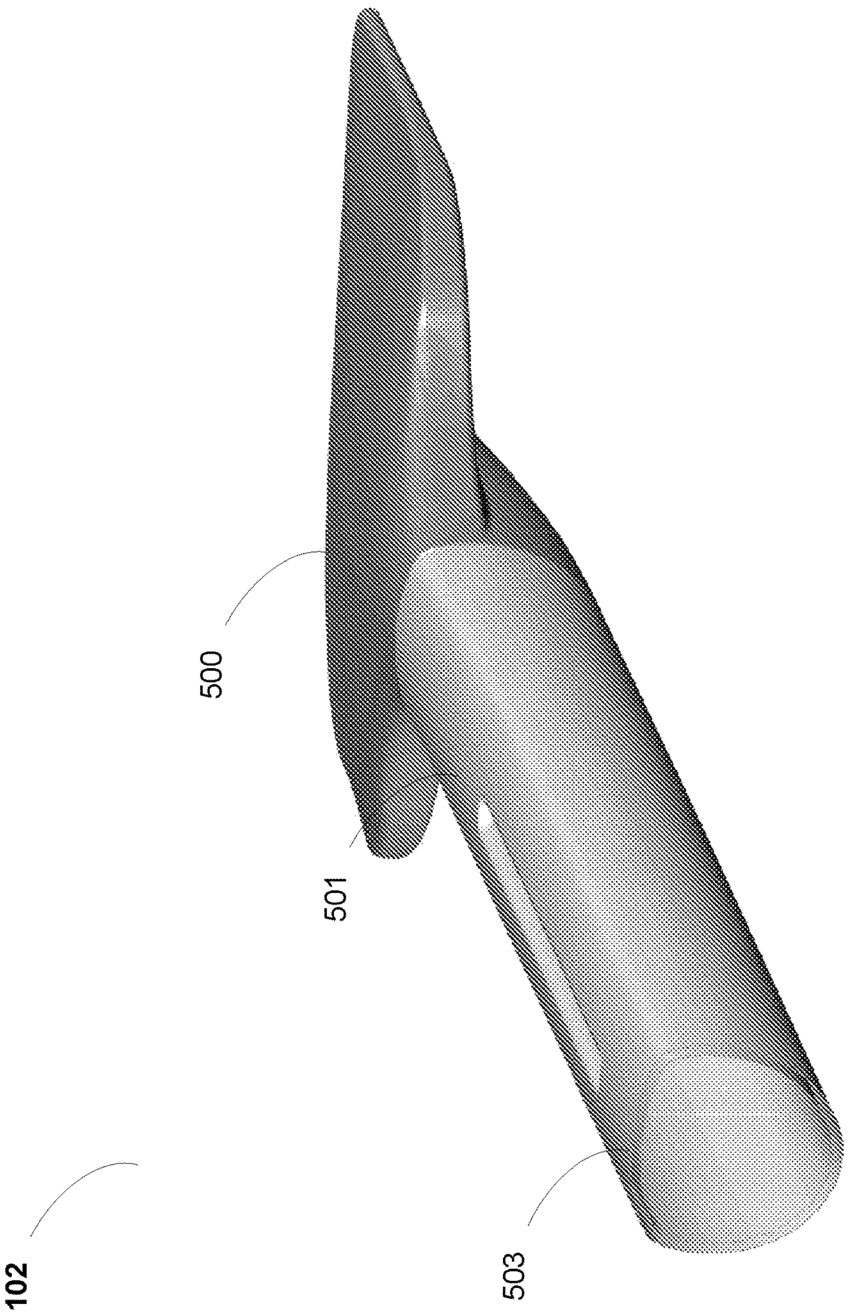
FIG. 5C is a perspective transverse cross-sectional view of the example kitchen implement of FIGS. 5A and 5B.
Figure 5D:
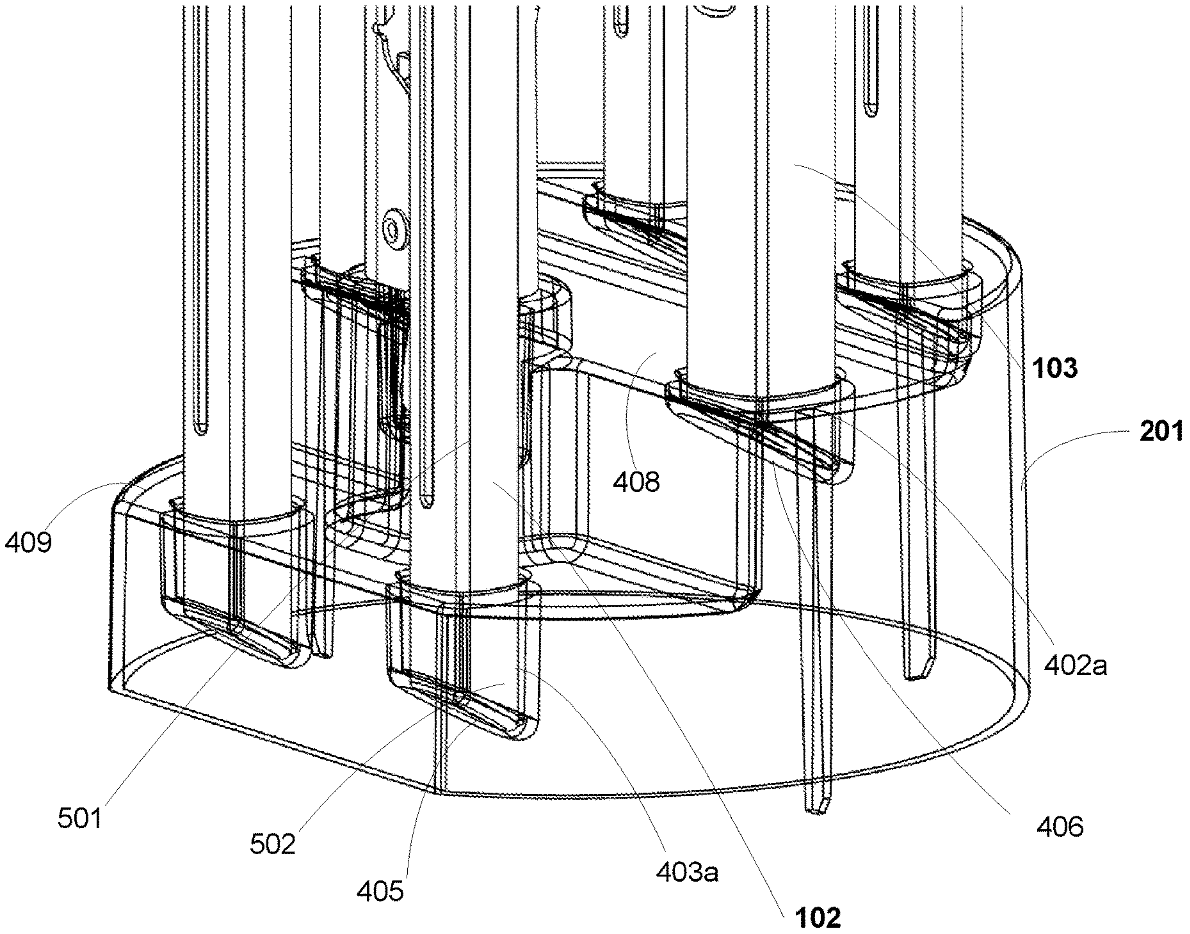
FIG. 5D shows an example arrangement of the example kitchen implements of FIG. 1A, including the example kitchen implement of FIG. 5A, with the example platform of FIG. 4A (transparent).
Figure 5E:
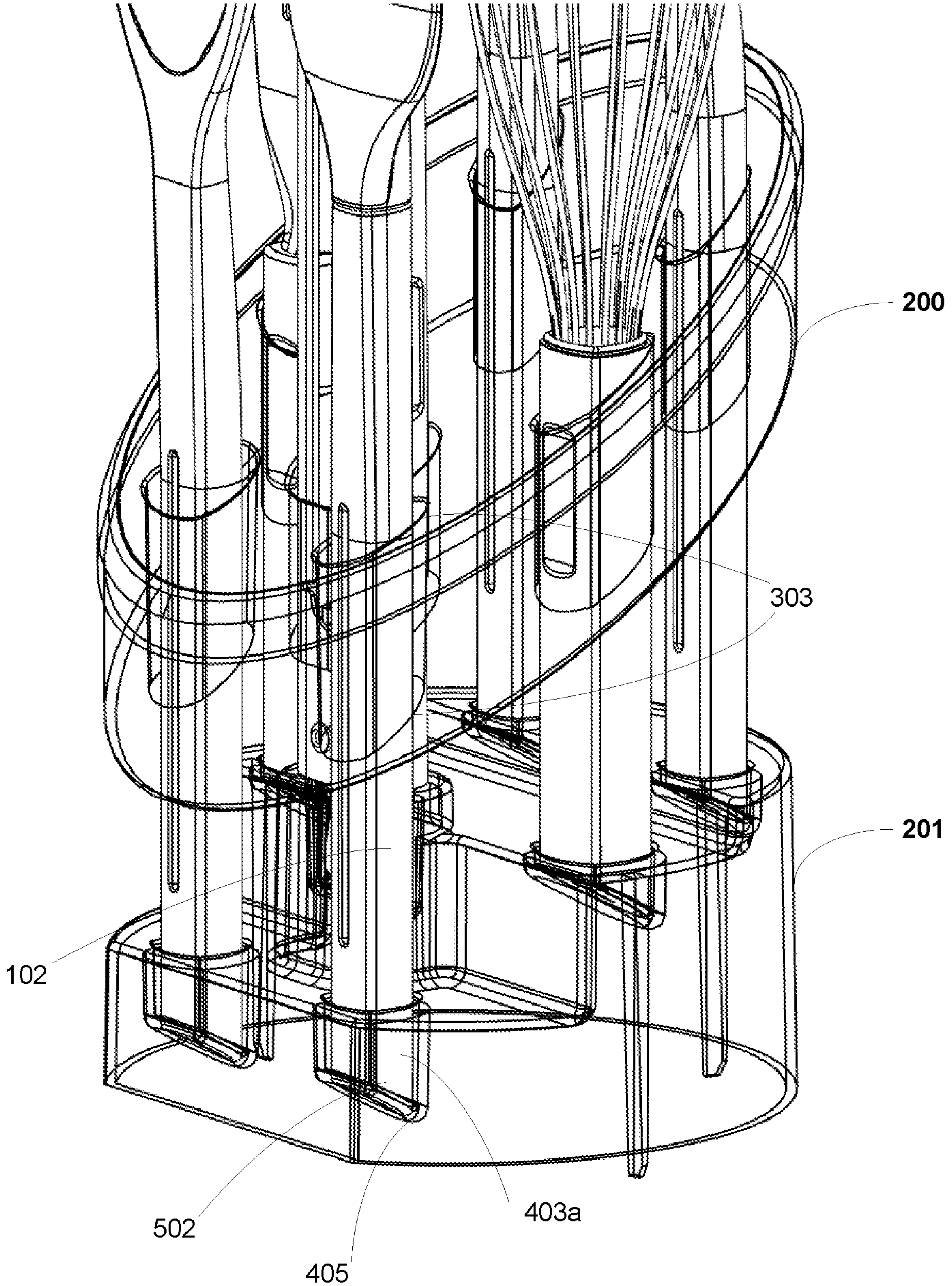
FIG. 5E shows an example arrangement of the example kitchen implements of FIG. 1A, including the example kitchen implement of FIG. 5A, with the example implement guide member of FIG. 3A and the example platform of FIG. 4A (both transparent).

For example, FIGS. 5A-5C illustrate an example kitchen implement—a spatula 102. For simplicity only the relationship among indentation 403, cavity 403*a*, and spatula 102 will be discussed. It is to be understood that the relationship among other implement handles (including their respective terminal ends), indentations 400 and 401, and cavities 400*a* and 401*a* (save indentation 402 and cavity 402*a*, discussed further below) may be substantially similar in all respects. Spatula 102 may include a head 500, a handle 501, a terminal end 502, and a perimetric profile 503. In one example, terminal end 502 may be formed at an angle relative to the ground plane. Referring again to FIG. 4B, spatula 102 may be seated in cavity 403*a*, which may define a space that is contiguous with the perimetric profile of handle 501. Further, cavity 403*a* may include a bottom surface 405 that may be formed at a substantially similar angle as that of the terminal end 502 of spatula 102 (with respect to the ground plane). FIG. 5D illustrates an example arrangement of kitchen implements whereby handle 501 of spatula 102 is substantially contiguous with indentation 403 and cavity 403*a*, and whereby cavity 403*a* includes a bottom surface 405 that is formed at an angle substantially equivalent to that of the terminal end 502 of handle 501 of spatula 102. In another example, the bottom surface 405 might not be formed with an angle that corresponds to that of the terminal end 502 of handle 501. In yet another example, the terminal end 502 of handle 501 may be formed with a geometry that is parallel to the ground plane (i.e., at an angle of zero degrees, flat).

Platform 201 may also be configured such that the heads of the kitchen implements may be vertically offset from one another so that each head is accessible and visible from the others. Referring again to FIG. 4B, platform 201 may include a surface 407, a surface 408, and a surface 409. In one example, the surfaces 407-409 may be tiered (i.e., a staircase arrangement). For example, surface 408 may rise higher than surface 409, and surface 407 may rise higher than surface 408. In other examples, surfaces 407-409 may extend to the same heights or may extend to higher or lower heights with respect to each surface. Cavities 400*a*-403*a* may terminate at different depths below the surfaces 407-409, respectively, based on several factors including the height of surfaces 407-409, the length of a given kitchen implement handle, and/or the length of a given kitchen implement head. FIG. 5D is illustrative of both principles. For example, surface 408 may be tiered above surface 409. Indentation 402 and cavity 402*a* may be configured to receive and house a whisk 103. The total length of the whisk handle and the whisk head may be a given length. Indentation 403 and cavity 403*a* may be configured to receive and house the spatula 102. The total length of the spatula handle 501 and head 500 may be another given length. As a result of the given lengths of both kitchen implements being known, the cavities 403*a* and 402*a* may be formed to terminate at particular depths in order for the head of whisk 103 to be vertically offset from the head 500 of the spatula 102 (as shown in FIG. 1A). As a result of rising above the head of spatula 102, the head of the whisk 103 may be more accessible to a user, and may be retrieved without disturbing spatula 102 from its stored position.

Referring again to FIGS. 4A and 4B, indentation 402 and cavity 402*a* may be configured to receive and house a terminal end portion of a set of tongs. Indentation 402 may be formed in the surface 411 of the platform 201. Surface 411 may rise to a height above, below, or equal to the surfaces 407-409. The terminal end portion of the set of tongs (not shown) may include a locking tab (not shown). Cavity 402*a* may define a space that corresponds to dimensions of the locking tab.

Figure 6:
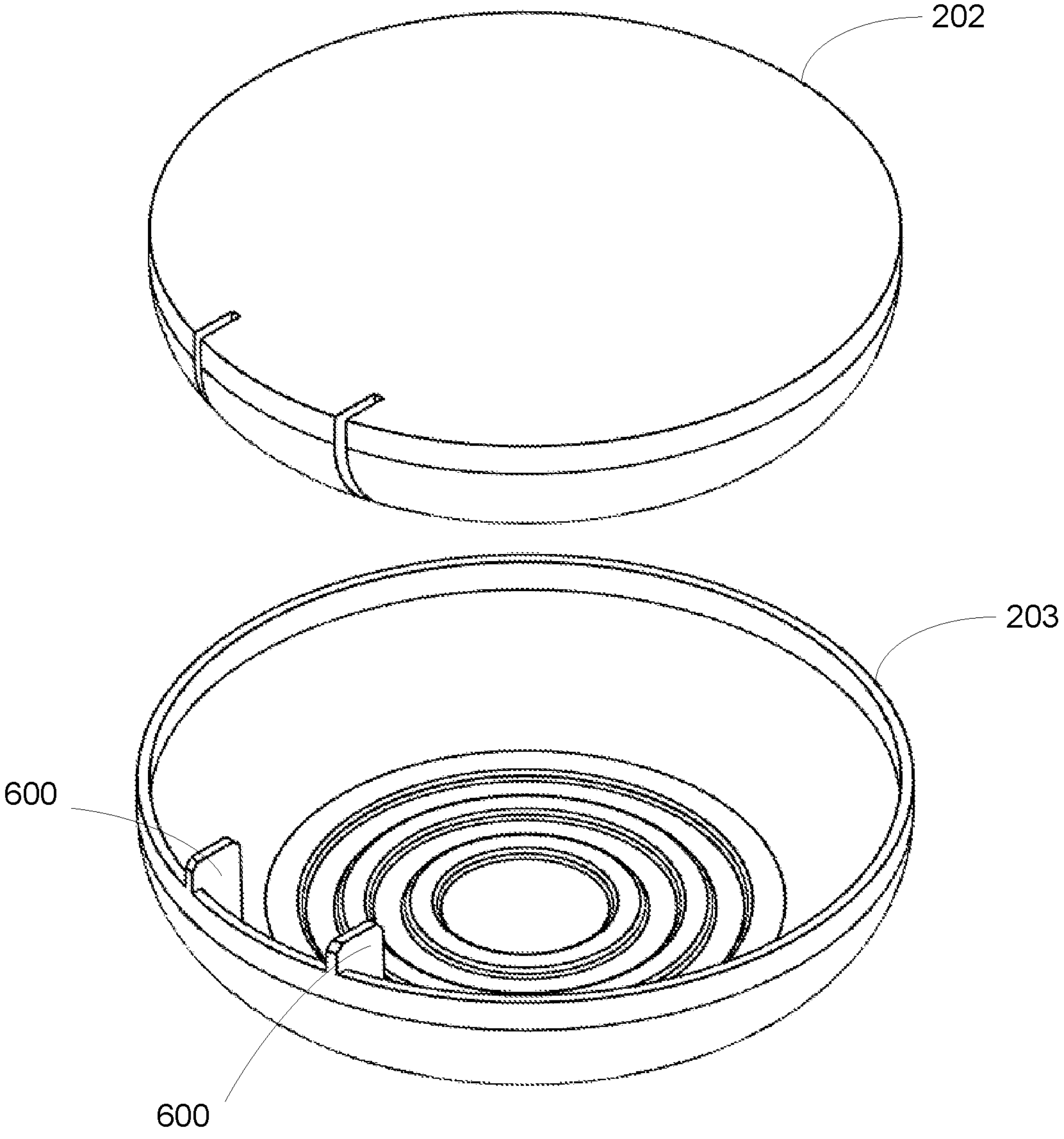
FIG. 6 is an exploded perspective view of an example weighted portion and an example base of the example kitchen implement organizer of FIG. 1B.

FIG. 6 illustrates an example base 203 and an example weighted portion 202. Weighted portion 202 may be water, sand, concrete, clay, or other material that may help provide the implement organizer 101 with a lower center of gravity. In one example, the weighted portion 202 may be composed of a concrete or concrete-like substance, that, when hardened, couples the base 203 to the platform 201. Referring again to FIG. 4B, the platform 201 may include a plurality of integrally molded posts 410 that help anchor the platform 201 to the base 203 as a result of the weighted solid hardening around the posts 410. Base 203 may include a plurality of rails 600. Platform 201 may include a front face 411. The rails 600 may be configured to contact front face 411 in order to ensure that the platform is correctly oriented when seated in the housing 204. Referring again to FIGS. 2A and 6, base 203 may be coupled to an interior bottom surface of the base 206 (not shown) with an adhesive, for example a food-safe adhesive, or may be coupled with rivets or other similar fasteners. The base 206 of housing 204 may include an opening through which an overmold 800 of base 203 may contact the surface upon which implement organizer 101 rests.

Figure 7:
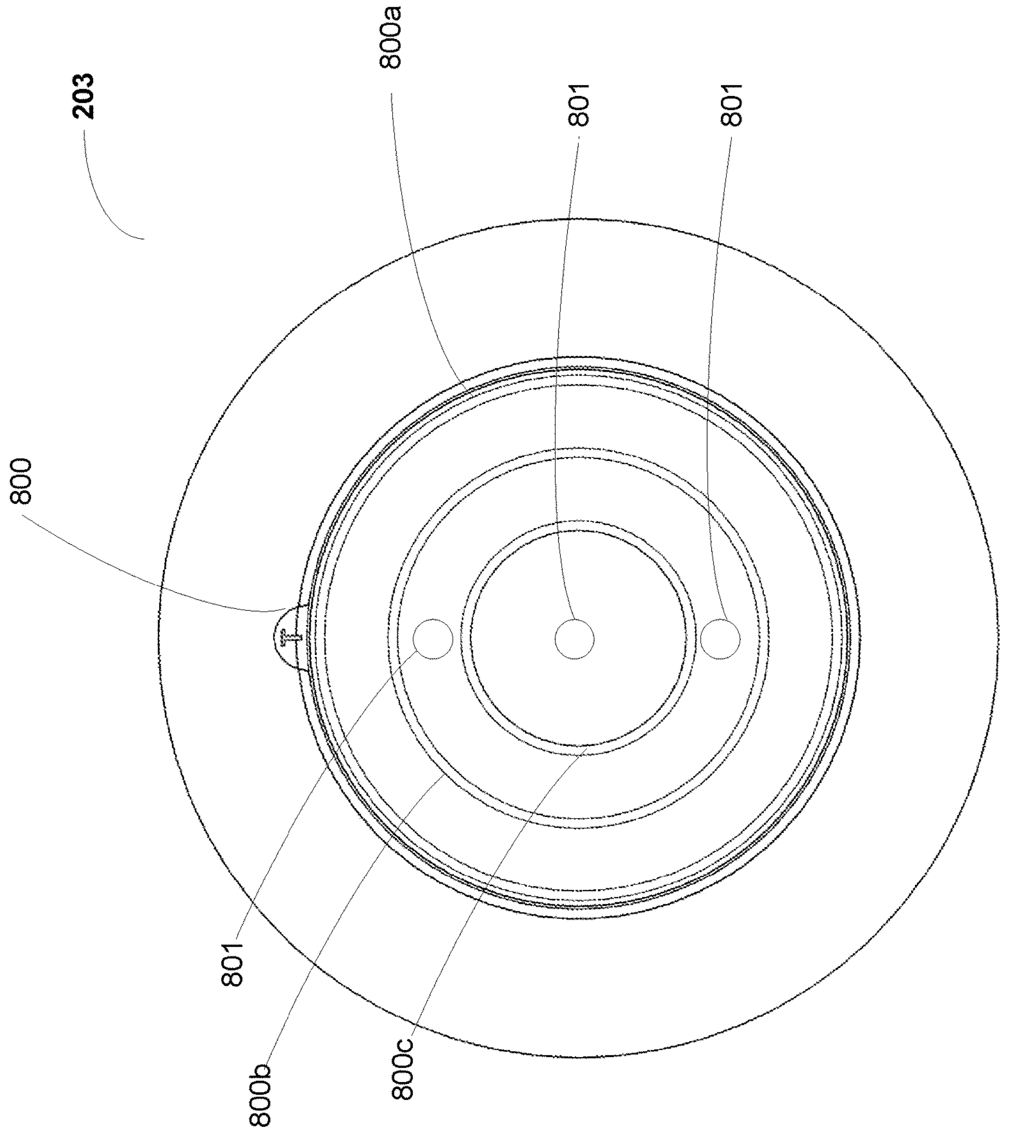
FIG. 7 is a bottom-up view of the example base of FIG. 6.

FIG. 7 illustrates a bottom-up view of an example base 203. In this example, base 203 may include one or more drain holes 801. Drain holes 801 may be disposed in a number of arrangements along the bottom surface of base 203 and may be configured with a variety of diameters. Additionally, base 203 may include an overmold 800. Overmold 800 may be rubber, synthetic rubber, rubber-like plastic, or other hard plastic. Overmold 800 may include one or more anti-slip members. In one example, appendages 800*a*-800*c* may be concentrically-molded rubber or plastic rings that help maximize friction between the implement organizer 101 and the surface upon which it rests, thereby helping prevent unwanted movement or slipping of the implement organizer 101. Further, anti-slip members 800*a*-800*c* may create a space between the ground surface and the drain holes 801 to help promote circulation of air and/or expulsion of any moisture, liquids, or debris. In an alternative example, the kitchen implement organizer might not include a base 203 and/or might not include an opening in the base 206 of housing 204. For example, the bottom surface of base 206 (not shown) may include channels formed integral to the base 206 and may be inlaid with rubber gaskets, etc. Alternatively, anti-slip members, such as rubber feet, may be coupled to the bottom surface of base 206 with an adhesive or with a fastener such as a screw or a rivet.

In the foregoing specification, the present disclosure has been described with reference to specific exemplary examples thereof. Although the disclosure has been described in terms of a preferred example, those skilled in the art will recognize that various modifications, examples or variations of the disclosure can be practiced within the spirit and scope of the disclosure as set forth in the appended claims. The specification and drawings are, therefore, to be regarded in an illustrated rather than restrictive sense. Accordingly, it is not intended that the disclosure be limited except as may be necessary in view of the appended claims.

The invention claimed is:

1. An apparatus comprising:
   - an implement guide member comprising a first hole extending from a top surface of the implement guide member through a bottom surface of the implement guide member, wherein the first hole is configured to receive a first implement handle;
   - a platform disposed beneath the implement guide member comprising a first surface, the first surface comprising a first cavity that is vertically aligned with the first hole of the implement guide member, wherein the first cavity is configured to receive a first terminal end of the first implement handle;
   - wherein the first hole of the implement guide member comprises a first inner surface that corresponds to a first outer surface of the first implement handle;
   - a housing defining an internal space and comprising:
     - a top edge; and
     - at least one sidewall; and
   - a base coupled to the housing; and
   - wherein the internal space comprises the platform, wherein the base is disposed between a bottom surface of the housing and the platform, wherein the platform further comprises a side surface that corresponds to the geometry of the sidewall of the housing, wherein the implement guide member further comprises a shoulder, wherein the shoulder is suspended by the top edge of the housing.

2. The apparatus of claim 1 wherein:

the platform further comprises:

a second surface tiered above the first surface; and a second cavity;

wherein the implement guide member further comprises a second hole extending from the top surface of the implement guide member through the bottom surface of the implement guide member; and wherein the second cavity is vertically aligned with the second hole of the implement guide member and is configured to receive a second terminal end of a second implement handle.

3. The apparatus of claim 2 wherein the second hole of the implement guide member comprises a second inner surface that corresponds to a second outer surface of the second implement handle.

4. The apparatus of claim 3 wherein the first cavity of the platform comprises a first face that corresponds to the first outer surface of the first implement handle, and wherein the second cavity of the platform comprises a second face that corresponds to the second outer surface of the second implement handle.

5. The apparatus of claim 1 wherein the first cavity defines a first space that corresponds to the first terminal end of the first implement handle.

6. The apparatus of claim 2 wherein the second cavity defines a second space that corresponds to the second terminal end of the second implement handle.

7. The apparatus of claim 1 wherein the top edge of the housing is configured to suspend the shoulder at an angle of greater than five degrees relative to a ground plane, wherein the second hole is disposed above the first hole of the implement guide member.

8. The apparatus of claim 1, further comprising a weighted portion between the platform and the base.

9. The apparatus of claim 1, wherein the base is rotatably coupled to the housing.

10. The apparatus of claim 1, wherein the base further comprises a drain hole.

11. A system comprising:

a first implement comprising:

a first handle comprising a first length and a first terminal end; and a first head coupled to the first handle opposite the first terminal end; and a second implement comprising:

a second handle comprising a second length and a second terminal end; and a second head coupled to the second handle opposite the second terminal end;

an implement organizer comprising:

an implement guide member comprising a first hole and a second hole, the first hole and the and second hole extending from a top surface of the implement guide member through a bottom surface of the implement guide member, the first hole configured to receive the first handle, the second hole configured to receive the second handle; and a platform disposed beneath the implement guide member comprising:

a first surface comprising a first cavity;

a second surface tiered above the first surface and comprising a second cavity;

wherein the first cavity is vertically aligned with the first hole of the implement guide member and is configured to receive the first terminal end of the first handle, wherein the second cavity is vertically aligned with the second hole of the implement guide member and is configured to receive the second terminal end of the second handle; and wherein the first terminal end of the first handle of the first implement and a bottom surface of the first cavity are configured with an angle of greater than five degrees relative to a ground plane.

12. The system of claim 11, further comprising:

a housing defining an internal space and comprising:

a top edge; and at least one sidewall; and a base coupled to the housing;

wherein the internal space comprises the base and the platform, wherein the base is disposed between the bottom surface of the housing and the platform, wherein the implement guide member further comprises a shoulder, wherein the shoulder is suspended by the top edge of the housing.

13. The system of claim 12, wherein when the first implement and the second implement are seated in the platform, the first head of the first implement is offset a first distance from the base and wherein the second head of the second implement is offset a second distance from the base.

14. The system of claim 13, wherein the first distance is less than the second distance.

15. The system of claim 13, wherein the first distance is equal to the second distance.

16. The system of claim 12 wherein the top edge of the housing is configured to suspend the shoulder at an angle of greater than five degrees relative to a ground plane, and wherein the second hole is disposed above the first hole of the implement guide member.

* * * * *